(12) United States Patent
Adamic et al.

(10) Patent No.: US 9,017,466 B2
(45) Date of Patent: Apr. 28, 2015

(54) ERASABLE INKJET INK COMPOSITION

(75) Inventors: Raymond Adamic, Corvallis, OR (US); Larrie Alan Deardurff, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/114,952

(22) PCT Filed: Jun. 3, 2011

(86) PCT No.: PCT/US2011/039023
§ 371 (c)(1), (2), (4) Date: Oct. 31, 2013

(87) PCT Pub. No.: WO2012/166148
PCT Pub. Date: Dec. 6, 2012

(65) Prior Publication Data
US 2014/0060382 A1 Mar. 6, 2014

(51) Int. Cl.
*C09D 11/36* (2014.01)
*C09D 11/328* (2014.01)

(52) U.S. Cl.
CPC .............. *C09D 11/36* (2013.01); *C09D 11/328* (2013.01)

(58) Field of Classification Search
CPC ...... C09D 11/32; C09D 11/328; C09D 11/36; C09D 11/50

USPC ........................ 106/31.27, 31.6, 31.58, 31.86
See application file for complete search history.

(56) References Cited

U.S. PATENT DOCUMENTS

| 4,954,174 | A | | 9/1990 | Imagawa | |
|---|---|---|---|---|---|
| 4,960,464 | A | | 10/1990 | Chen | |
| 5,711,791 | A | * | 1/1998 | Croker et al. | 106/31.35 |
| 5,852,073 | A | | 12/1998 | Villiger et al. | |
| 6,013,122 | A | * | 1/2000 | Klitzman et al. | 106/31.03 |
| 6,444,021 | B1 | | 9/2002 | Weisbecker et al. | |
| 2004/0225032 | A1 | | 11/2004 | Spencer et al. | |
| 2006/0034984 | A1 | * | 2/2006 | Baydo et al. | 426/250 |
| 2007/0228005 | A1 | * | 10/2007 | Hasegawa et al. | 216/58 |
| 2008/0193725 | A1 | * | 8/2008 | De Saint-Romain | 428/195.1 |

FOREIGN PATENT DOCUMENTS

| JP | 2000-056497 | 2/2000 |
|---|---|---|
| JP | 2000-154345 | 6/2000 |
| KR | 2009-0041874 | 4/2009 |
| WO | WO 2007/005063 | 1/2007 |

* cited by examiner

*Primary Examiner* — Veronica F Faison
(74) *Attorney, Agent, or Firm* — Dierker & Associates, P.C.

(57) ABSTRACT

An erasable inkjet ink composition includes an ink vehicle including a solvent, and a colorant added to the ink vehicle. The colorant is chosen from an iron-based ionic complex, an iron-based ionic complex in combination with a dye, a non-ascorbic acid based complex, and a dye-blend mono-based colorant.

15 Claims, 5 Drawing Sheets

ERASABLE INKJET INK COMPOSITION

BACKGROUND

The present disclosure relates generally to erasable inkjet ink compositions.

Inkjet printing is an effective way of producing images on a print medium, such as paper. Inkjet printing generally involves ejecting ink droplets (formed, e.g., from one or more inks) from a nozzle at high speed by an inkjet printing system onto the paper to produce the images thereon. In some instances, it may be difficult to effectively erase the inkjet ink(s) when the inks are in the solid state, such as when the inks are established on the paper.

BRIEF DESCRIPTION OF THE DRAWINGS

Features and advantages of examples of the present disclosure will become apparent by reference to the following detailed description and drawings, in which like reference numerals correspond to similar, though perhaps not identical components. For the sake of brevity, reference numerals or features having a previously described function may or may not be described in connection with other drawings in which they appear.

DETAILED DESCRIPTION

Figure 1:
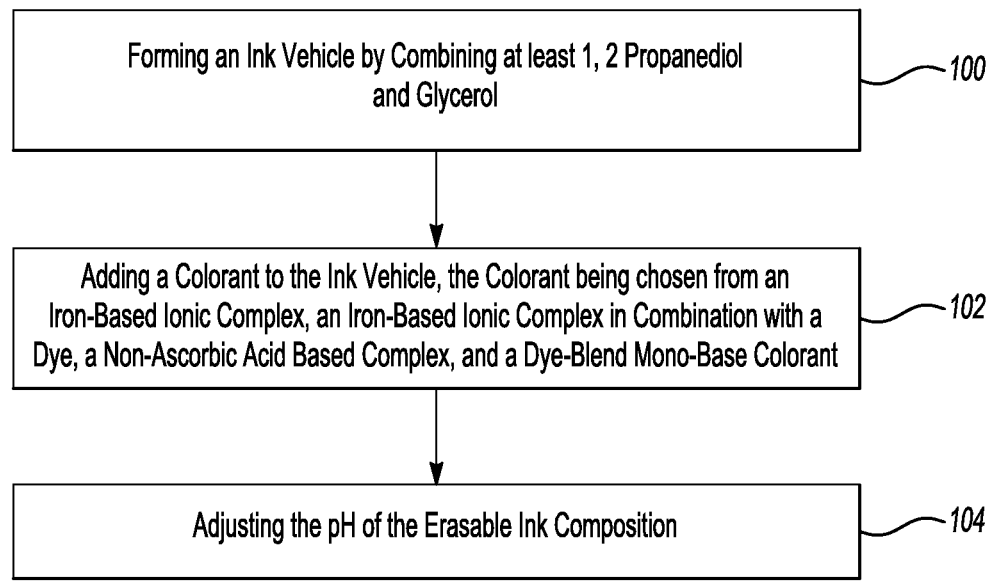
FIG. 1 is a flow diagram depicting an example of a method of making an erasable inkjet ink composition.

Example(s) of the erasable inkjet ink composition as disclosed herein, when established on a medium, are erasable from the medium when the colorant of the ink interacts with an erasure component of an erasure fluid. The interaction between the colorant and the erasure component causes the molecular structure of the colorant to degrade, and the degradation of the colorant structure causes the colorant to disappear from the surface of the medium. As used herein, the colorant "disappears" from the surface of the medium when about 80% to about 100% of the image (i.e., the ink) is removed when an erasure fluid is applied to the image. Examples of the erasure fluid that may be used to erase the image formed on the medium are found in PCT International Application Serial No. PCT/US11/39014 filed concurrently herewith, and which is incorporated herein by reference in its entirety, while examples of the erasable inkjet ink specifically designed to interact with examples of the erasure fluid will be described in detail below.

The inventors of the present disclosure have found that when examples of the erasable inkjet ink interact with examples of the erasure fluid, images formed by the ink are erased (or removed) in a relatively "human-friendly" and "environment-friendly" manner. This may due, at least in part, to the fact that the examples of the erasable inkjet ink and examples of the erasure fluid are specifically formulated to include human-friendly and environment-friendly components. It is to be understood that as used herein, the terms "human-friendly" or the like and "environment-friendly" or the like are defined as components: listed as Generally Recognized As Safe (GRAS) by the United States Food and Drug Administration (FDA); complying with the FDA's Federal Food, Drug and Cosmetic Act (FFDCA); appearing in the United States Environmental Protection Agency's (EPA) CleanGredients® list; and/or appearing in similar lists; and/or categorized in a similar manner.

Further, the erasure fluid applied to the image formed by the erasable ink to erase the image from the medium is tied, at least in part, to the nature of the colorant(s) of the erasable inkjet ink. For example, certain colorants have been found to be more erasable than others; and thus the composition of the erasure fluid may be specifically designed to erase a particular colorant or a particular type of colorant so that the interaction between the two may effectively degrade the colorant(s) and remove the image from the medium. Accordingly, several different examples of the erasable inkjet ink may be formulated, where each may be specifically designed to be used in combination with a particular erasure fluid to erase or remove the ink from the medium. Some examples of combinations of erasure fluids and inkjet inks that are contemplated as being within the purview of the present disclosure will be provided below.

It is further to be understood that the erasable inkjet ink is designed to be erasable from a medium such as paper. The paper may be chosen from any cellulose-based paper, i.e., paper that includes cellulose fibers. For instance, the medium may be made from pulp fibers derived from hardwood trees (e.g., deciduous trees (angiosperms) such as birch, oak, beech, maple, and eucalyptus) and/or softwood trees (e.g., coniferous trees (gymnosperms) such as varieties of fir, spruce, and pine, (e.g., loblolly pine, slash pine, Colorado spruce, balsam fir and Douglas fir)), and these pulps may be prepared via any known pulping process. Further, the cellulose-based paper may include one or more fillers to control the physical properties of the medium. Examples of fillers include ground calcium carbonate, precipitated calcium carbonate, titanium dioxide, kaolin clay, silicates, and combinations thereof. It is to be understood that the cellulose-based paper may be referred to herein as plain paper.

Other examples of the paper medium include resin-coated papers (such as, e.g., photobase paper) and papers made from or including polyethylene (PE), polypropylene (PP), polyethylene terephthalate (PET), polylactic acid (PLA), and/or the like, and/or combinations thereof.

In another example, the medium may be chosen from COLORLOK® papers (available from Hewlett-Packard Co., Houston, Tex.), which are plain papers having calcium chloride incorporated in the paper structure.

Examples of the erasable inkjet ink will now be described herein. In each of these examples, the ink generally includes an ink vehicle, and a colorant added to the ink vehicle. As used herein, the term "ink vehicle" refers to the combination of at least one or more solvents and water to form a vehicle within which the colorant is added to form the erasable inkjet ink. The solvent(s) is/are basically used as a carrier for at least the colorant of the ink and may, in some examples, constitute the bulk of the erasable inkjet ink. In some examples of the inkjet ink, the solvent is chosen from 1,2-propanediol, glycerol, 1,2-hexanediol, 1,5-pentanediol, 1,6-hexanediol, 2-methyl-1,3-propanediol, trimethylolpropane, and combinations thereof. It is to be understood that the solvent (or combination of solvents) is desirably chosen from one or more solvents that are considered to be "human-friendly" and "environment-friendly", as previously mentioned.

Some examples of human-friendly and environment-friendly solvents include 1,2-propanediol, glycerol, and combinations thereof. However, it is to be understood that the other solvents listed above may also be used in the examples of the erasable ink disclosed herein. Further, the solvent(s) may be present in the ink in an amount ranging from about 1 wt % to about 50 wt % of the erasable inkjet ink; and in another example, ranging from about 1 wt % to about 30 wt %. In yet another example, the amount of solvent(s) ranges from about 20 wt % to about 30 wt % of the erasable inkjet ink; and in still another example, ranges from about 1 wt % to about 15 wt %.

The vehicle may, in some examples, include an additive, which is a constituent of the ink that may operate to enhance performance, environmental effects, aesthetic effects, or other similar properties of the ink. Examples of the additive include surfactants, polymers, pH buffers, biocides, and/or the like, and/or combinations thereof. Some suitable examples of additives contemplated as being within the purview of the present disclosure may be found in the CleanGredients® list from the United States Environmental Protection Agency (EPA), and/or in other similar lists/categories described above. Some additives will be described hereinbelow in conjunction with some examples of the inkjet ink.

It is to be understood that, in some examples of the ink, the ink vehicle does not include an additive.

As used herein, the term "colorant" refers to a constituent of the ink that imparts a color to the ink. In the examples of the inkjet ink disclosed herein, the colorant is chosen from those that are considered to be "human-friendly" and "environment-friendly", as previously mentioned, and these colorants are degradable by chemical means such as via decolorization or mineralization techniques. Certain colorants that exhibit characteristics of high permanence, such as those that were considered to be lightfast or waterfast and/or pigment-based colorants were generally avoided. Rather, the colorants were chosen from those that tended to produce a stable color, but may be readily degraded in order to erase them. The colorants were also chosen from those that tended to break down into products that minimally affect the potential reuse of the medium (upon which the ink was printed) after erasing. It was found that colorants commonly used in the food, pharmaceutical, and/or cosmetic industries worked well.

It is to be understood that the composition (including the concentration) of the components of the inkjet ink depends, at least in part, on the colorant selected. Furthermore, the colorant may be selected from one or more colorants that favorably interact with a particular erasure fluid to effectively erase an image formed when the inkjet ink is printed on a medium. In light of these considerations, several compositions of the erasable inkjet ink are contemplated herein, and examples of these ink compositions will be disclosed hereinbelow.

In one example, the colorant may be chosen from a mono-based colorant; i.e., a colorant that produces a neutral color when the ink is printed. The neutral color may be achieved, for instance, when the color space coordinate L* is minimized, and the color space coordinates a* and b* are individually close to zero. L* is minimized when L* is as close to zero as possible, such as when L* is less than 70. In another example, the L* is minimized when L* ranges from 20 to 40. Further, a* and b* are individually close to zero when each of the coordinates ranges from +1 to −1. An example of a mono-based colorant is one containing an ionic complex such as, e.g., an iron-based ionic complex. Other examples of mono-based colorants include those containing an ionic complex formed from other metal ions in combination with a ligand to form the ionic complex. Examples of the other metal ions include copper, manganese, cobalt, zinc, titanium, and tin.

Figure 4:
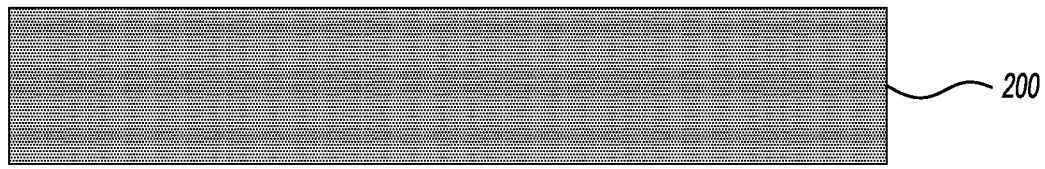
FIGS. 4-6 and 8 are representations of images formed by printing examples of the erasable inkjet ink on a medium.

Inks including an iron-based ionic complex colorant, for example, produce a color that may be classified as dark purple (and which may be referred to as a purple-hued mono ink). An example of the ink including the iron-based ionic complex printed on HP Recycled Office Paper (Hewlett-Packard Co., Houston, Tex.) is shown in the representation of FIG. 4.

In an example, the purple color mentioned above may be produced by combining the ferrous (II) ion with ascorbic acid (which is the synthetic version of Vitamin C, and is often provided as a Vitamin C supplement) at a 2:1 ratio of ascorbic acid to Fe(II) when in the solid state, and at about a 1:1 or 2:1 ratio of ascorbic acid to Fe(II) when in solution. This produces a dark purple-colored ink in solution as well as when printed on plain paper. This iron-based ionic complex is called iron ascorbate (which is available from Sigma Aldrich, St. Louis, Mo.), and the instant example of the inkjet ink containing this colorant has an ultraviolet and visible (UV-VIS) absorption ranging from about 350 nm to about 700 nm. In an example, when iron ascorbate is used as the colorant, the amount of the colorant present in the ink ranges from about 1 wt % to about 6 wt % of the ink; and in another example, ranges from about 2 wt % to about 4 wt % of the erasable inkjet ink. In yet another example, the amount of the iron ascorbate ranges from about 3 wt % to about 4 wt % of the ink.

It is to be understood that the pH of the inkjet ink is an important aspect of the ink composition. For instance, an inkjet ink formulated using iron ascorbate as the colorant having a pH greater than 7.5 may form ferric hydroxides that may form various stoichiometries of iron oxide. However, the colorant may be considered to be weak (i.e., may not produce the desired color when the ink is printed) when the pH is less than about 5 (which may occur, for example, when the $pK_a$ of the ascorbic acid in combination with water in the ink drifts downwards). For example, at a pH of less than 5, the iron ascorbate may produce a color having a brownish hue, rather than a dark purple hue.

In an example, the pH may be adjusted or otherwise maintained by incorporating a pH buffer as an additive into the ink vehicle. Examples of the pH buffer include 3-(N-morpholino)propanesulfonic acid (MOPS), 3-morpholino-2-hydroxy-propanesulfonic acid (MOPSO), 1,4-piperazinediethanesulfonic acid (PIPES), tris(hydroxymethyl)aminomethane (TRIS), and/or other similar biological buffers. Other examples of buffers include inorganic buffers such as sodium acetate, sodium phosphate, and/or sodium borate. In an example, the pH of an inkjet ink containing iron ascorbate ranges from about 5 to about 7.5; and in another example, ranges from about 6 to about 7. The foregoing ranges may be achieved, e.g., by incorporating the pH buffer into the ink vehicle of the respective inks in an amount ranging from about 0.2 wt % to about 3 wt % of the inkjet ink. In another example, the pH buffer may be present in an amount ranging from about 0.5 wt % to about 2 wt % of the inkjet ink.

In some cases, the ferrous ion having the +2 oxidation state (i.e., iron (II) or $Fe^{+2}$) has a tendency to auto-oxidize to the +3 oxidation state (i.e., iron (III) or $Fe^{+3}$). The ascorbic acid of the ionic complex may, for instance, act as a reducing agent to minimize the auto-oxidation of the ferrous ion in solution (e.g., when in the cartridge inside the printer) or in the solid state (e.g., when printed on the medium). In some cases, another reducing agent (such as, e.g., cysteine, sodium dithionite, and/or gallic acid) may be incorporated into the instant example of the erasable inkjet ink to prevent the auto-oxidation of the ferrous ion.

Since ionic complexes such as iron ascorbate are sensitive to oxygen, the ink vehicle may, in some examples, have to be deoxygenated before the iron ascorbate is added to the vehicle to form the inkjet ink. Generally, the deoxygenation involves the removal of oxygen from the ink vehicle so that the oxygen does not degrade the colorant when the colorant is added to the vehicle. It has been found that sufficient deoxygenation may be accomplished by adding any of sodium bisulfite or sorbitol to the ink vehicle. It has further been found that the image quality of the ink when printed on the medium is improved by the presence (and, in some instances, the concentration) of sodium bisulfite alone, or in combination with sorbitol. In an example, the amount of sodium bisulfite present (if used in the ink) is less than about 1 wt %; and in another example, is less than about 0.5 wt % of the erasable inkjet ink. In another example, the amount of sorbitol present (if used in the ink) is less than about 6 wt %; and in another example, is less than about 2 wt % of the ink.

In some instances, it may be desirable to add a biocide to the ink vehicle, such as PROXEL® GXL (available from Arch Chemicals, Inc., Norwalk, Conn.) or KORDEK™ MLX (available from The Dow Chemical Co., Midland, Mich.). The biocide may be added to the ink to protect the ink from bacterial growth. The amount of the biocide present in the inkjet ink, if one is incorporated, ranges from about 0.05 wt % to about 1 wt %; and in another example, ranges from about 0.05 wt % to about 0.25 wt %. In yet another example, the amount of the biocide, if used, ranges from about 0.05 wt % to about 0.15 wt %.

Another additive that may be added to the ink includes a surfactant. The surfactant may be included in the ink, for example, to assist in controlling the physical properties of the ink, such as jetting stability, waterproofness and bleeding. One or more surfactants may be used in the ink, and may be present in an amount ranging from about 2 wt % to about 5 wt %.

The surfactant(s) may be chosen from nonionic surfactants or anionic surfactants, and are generally chosen from those that are "human-friendly" and "environment-friendly" as previously defined. Several commercially available nonionic surfactants may suitably be used in the formulation of the ink, examples of which include ethoxylated alcohols such as those from the TERGITOL® series (e.g., TERGITOL® 15S5, TERGITOL® 15S7, TERGITOL® 15S9, TERGITOL® TMN6) manufactured by Union Carbide, located in Houston, Tex.; surfactants from the SURFYNOL® series (e.g. SURFYNOL® 440 and SURFYNOL® 465) manufactured by Air Products and Chemicals, Inc., located in Allentown, Pa.; 2-diglycol surfactants, such as 1,2 hexanediol or 1,2-octanediol; or combinations thereof.

Some suitable anionic surfactant(s) that may be used in the ink compositions include surfactants of the DOWFAX® family (e.g., DOWFAX® 8390) manufactured by Dow Chemical Company, located in Midland, Mich.

Further, polymers may be added to the ink for stabilizing the ink, and for achieving improved water and rub resistance, relatively good durability, relatively good gloss and low bronzing of the ink on the substrate. Examples of polymers that may be used include carboxymethylcelluloses having a weight average molecular weight ranging from 90,000 to 1,000,000, methyl celluloses (such as, e.g., methyl hydroxyethyl ether cellulose), polyethylene glycols having a weight average molecular weight of 1,000 to 20,000, guar gum, gum arabic, starches (such as, e.g., rice starch), and combinations thereof. Sugar components (such as, e.g., sorbitol, mannitol, and other related glycogens, which have a viscosity lower than about 5 cP), may also be added to the polymers, and are capable of interacting with the polymer(s) to increase the viscosity. In an example, the polymer(s) (if any are used) are present in an amount of about 2 wt % or less.

It is to be understood that water makes up the balance of the ink vehicle, and thus the balance of the example of the inkjet ink disclosed above. Further, examples of an ink including a colorant based on iron ascorbate are shown in Tables 1 and 2 below.

Another example of the erasable inkjet ink includes a colorant chosen from an ionic complex in combination with a dye. It has been found that the incorporation of the dye with the ionic complex (such as, e.g., the iron ascorbate identified above) may produce colors having a sharper hue than with the ionic complex alone, and in some instances, exhibit improved color characteristics. It is to be understood that the color of the ink depends, at least in part, on the combination of the ionic complex and the dye. Typically, the ink will take the color of the dye, with perhaps some darkening due to the presence of the ionic complex (such as, e.g., the iron ascorbate). In this example of the ink, the ionic complex may be chosen from any of the examples of the ionic complexes disclosed above, and the dye may be chosen from natural dyes or synthetic dyes.

Some examples of natural dyes that may be used include anthocyanins (which, in combination with the iron ascorbate produces a cyan color (with perhaps a tinge of purple due to the presence of the iron ascorbate)), saffron (such as ColorMaker® Natural Yellow available from ColorMaker, Inc., and which, in combination with the iron ascorbate produces a yellow color), turmeric (which, in combination with the iron ascorbate also produces a yellow color), cochineal (a red dye derived from the cochineal insect, which, in combination with the iron ascorbate produces a magenta color, and may also be referred to as carmine, carminic acid (e.g., ColorMaker® Natural Magenta available from ColorMaker, Inc., Anaheim, Calif.), and which is also known as natural red 40), indigo carmine (which, in combination with the iron ascorbate produces a cyan color), and combinations thereof.

Some examples of synthetic dyes (some of which may be derived from natural products) that may be used include acid blue 9 (which, in combination with the iron ascorbate also produces a cyan color), caramel coloring (E150) made from caramelized sugar, Annatto (E160b) (a reddish-orange dye made from the seed of the achiote), Chlorophyll (E140) (a green dye made from chlorella algae), Betanin (i.e., Beetroot Red, which is a red colorant extracted from beets), Curcuminoids (E100) (i.e., Turmeric), Carotenoids (E160a) (i.e., Saffron), Paprika (E160c), Elderberry juice (which is a red food colorant from elderberries), Pandan (a green food colorant), Butterfly pea (a blue food dye), FDC blue 1, FDC blue 2, FDC yellow 5, FDC yellow 6, FDC red 3, FDC red 40, food black 2, Food Green 2, FDC Green 3, Food Yellow 3, Food Red 14, Natural Red 4 (such as Natural Red 2180 available from American Color Research Center, Inc. (San Dimas, Calif.)), red cabbage or other anthocyanin (such as Natural Blue 2179 also available from American Color Research Center, Inc.), and combinations thereof.

It is to be understood that one or more of the natural dyes identified above may also be synthetically made, and thus may, in some instances, also be considered to be a synthetic dye. In instances where the dye portion of the colorant is a combination of two or more dyes, the dye is referred to herein as a dye-blend.

It has been found that the inkjet ink of the instant example (containing a dye or dye-blend) exhibits traits of an ink containing the ionic complex alone as the colorant. In an example, synthetic dyes (such as those identified above) may be present in an amount ranging from about 0.5 wt % to about 6 wt % of the inkjet ink; and in another example, ranges from about 2.5 wt % to about 4 wt %. In another example, natural dyes (such as those that are also indicated above) may be present in an amount ranging from about 2 wt % to about 12 wt %; and in another example, ranges from about 2 wt % to about 5 wt %. Further, the amount of the iron ascorbate when used in combination with a synthetic dye is present in an amount ranging from about 0.5 wt % to about 5 wt % of the ink, and when used in combination with a natural dye is present in an amount ranging from about 2 wt % to about 12 wt % of the ink. In some instances, the dye-blend may include a natural dye in combination with a synthetic dye, and when the iron ascorbate is used in combination with this dye-blend, the iron ascorbate is present in an amount ranging from about 0.5 wt % to about 12 wt %, or in another example, in an amount ranging from about 2 wt % to about 4 wt %. A few examples of an ink including a colorant based on iron ascorbate in combination with a dye-blend are shown in Tables 3 and 4 below.

It is to be understood that the examples of the ink vehicle described above for the erasable inkjet ink formulated using the iron-based ionic complex alone may also be used in the erasable inkjet ink examples including a dye or dye-blend.

Additionally, the pH of the inkjet ink including the colorant formed from an ionic complex in combination with a dye may be adjusted based, at least in part, on the dye selected for the combination. Typically, if the dye is such that the pH of the ink would not fall within the pH range of the ink including the iron ascorbate alone, the iron ascorbate will not be combined with that particular dye. In one example, the pH of the ink including a combination of iron ascorbate and a dye ranges from about 6 to about 7.5. In a more specific example, the pH of the ink for a combination of iron ascorbate and anthocyanins ranges from 6.5 to 7.5, whereas the pH of an ink including a combination of iron ascorbate and saffron ranges from about 6 to about 7.5. Typically, inks containing a combination of iron ascorbate and a synthetic dye have a pH ranging from about 6 to about 7.

Yet another example of the erasable inkjet ink includes a colorant chosen from a non-ascorbic acid-based complex. Examples of the non-ascorbic acid-based complex include those formed from metal ions (e.g., $Fe^{+2}$, $Cu^{+2}$, $Mn^{+2}$, $Zn^{+2}$, etc.) in combination with a ligand chosen from a polyphenol. Examples of the polyphenol include caffeic acid, chlorogenic acid, gallic acid, hydroxytyrosol, protocatechuic acid, and the like, and combinations thereof. In another example, the ligand may be chosen 1,3-trimethylxanthine (i.e., caffeine). In yet other examples, combinations of polyphenols and caffeine may be used. Further, the metal ions may be obtained from various salts containing those ions. For instance, the ferrous (II) ion may be obtained from ferrous chloride, ferrous nitrate, ferrous sulfate, or potentially other counter-ions of iron. In another example, zinc ions may be obtained from zinc chloride, zinc nitrate, etc.; whereas manganese ions may be obtained from manganese (II) chloride, manganese (II) nitrate, etc. It is to be understood that other metal ions may similarly be obtained from salts.

An example of a non-ascorbic acid-based complex that may be used as the colorant of the ink includes the ferrous ion in combination with caffeic acid or chlorogenic acid (which is the quinic acid ester of caffeic acid), and this colorant produces a dark colored ink. An example of an ink including a colorant based on caffeic acid is shown in Table 5 below. Another example of a non-ascorbic acid-based complex includes gallic acid in combination with iron to produce a bluish-black and/or brown color depending, at least in part, on the pH of the combination, the amount of ferrous ions present, the solubility of the gallic acid, and the amount of the gallic acid present in the ink.

It is to be understood that the examples of the ink vehicle described above for the erasable inkjet ink formulated using the iron-based ionic complex alone may also be used in the erasable inkjet ink examples including a non-ascorbic acid-based complex.

In an example, the pH of an inkjet ink containing a non-ascorbic acid-based complex formed from caffeic acid, gallic acid, chlorogenic acid, hydroxytyrosol, protocatechuic acid, or combinations thereof ranges from about 6 to about 8; and in another example, ranges from about 6.5 to about 7.5.

Figure 8:
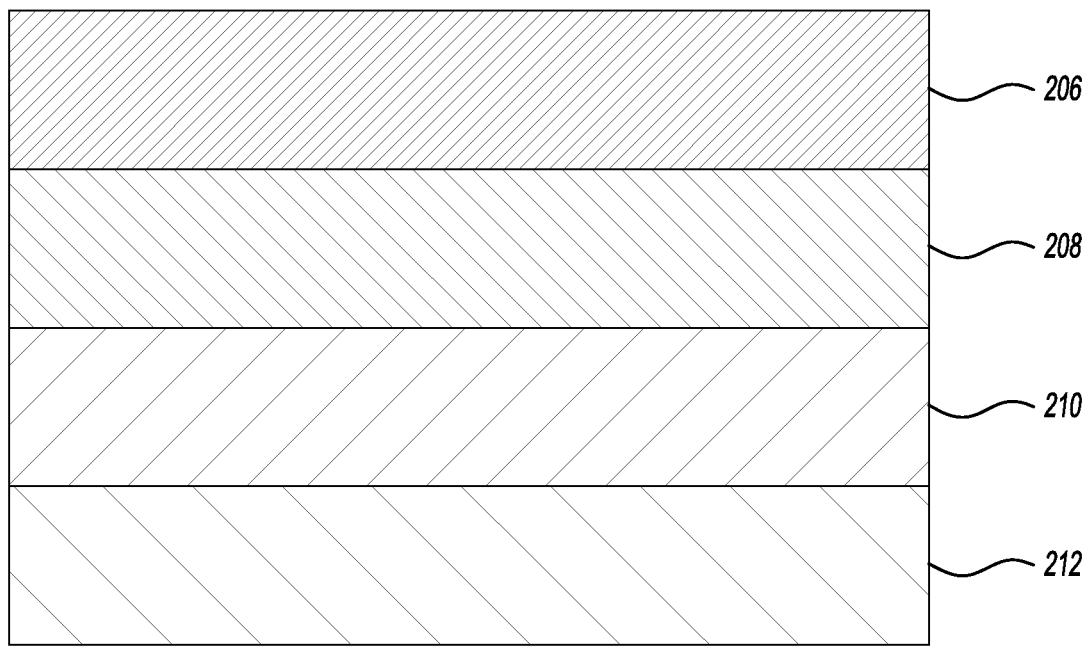

Still another example of the erasable inkjet ink includes one having a dye-blend mono-based colorant, which is a colorant formed from the mixture of two or more of the dyes previously disclosed. The dye-blend produces a color within a minimized color space coordinate L*, and an a* and b* that are individually close to zero. One example of an inkjet ink including a blend of cyan, magenta, and yellow dyes is shown in Table 6 below. It has also been found that the dye-blend mono-based colorants may additionally be used to form specifically colored inks, and an ink set (such as a cyan, magenta, and yellow (CMY) ink set) may be formed by the instant example of the inkjet ink. An example of such an ink set is shown in Tables 7 through 9 below, and an example of a representation of an image formed by printing these inks on HP Recycled Office Paper (Hewlett-Packard, Co.) is shown in FIG. 8.

The pH of the instant example of the inkjet ink may be adjusted as previously described. In instances where the colorant includes a dye chosen from a synthetic dye (such as, e.g., indigo carmine, food black 2, FDC Yellow 5, and FDC red 40), the pH of the ink ranges from about 4 to about 9; and in another example, ranges from about 6 to about 8. In instances where the colorant includes cochineal or saffron, the pH of the ink ranges from about 5 to about 9; and in another example, ranges from about 6 to about 8. Further, in instances where the colorant includes anthocyanins, the pH of the ink ranges from about 6 to about 9; and in another example, ranges from about 6 to about 8. In another example, where the colorant includes anthocyanins, the pH of the ink ranges from about 7 to about 9.

Some specific example formulations of the erasable inkjet ink are provided in Tables 1 through 5 below. It is to be understood that water makes up the balance of each of these formulations, although water is not explicitly included in each of the tables below.

TABLE 1

An example of an erasable inkjet ink containing iron ascorbate

| Component | Concentration |
|---|---|
| iron ascorbate | 3 wt % |
| 1,2-propanediol | 10 wt % |
| Glycerol | 5 wt % |

*The pH of the inkjet ink in Table 1 was adjusted to range from about 6 to about 7

TABLE 2

An example of an erasable inkjet ink containing iron ascorbate

| Component | Concentration |
|---|---|
| iron ascorbate | 3 wt % |
| 1,2-propanediol | 15 wt % |
| Glycerol | 10 wt % |

TABLE 2-continued

An example of an erasable inkjet ink containing iron ascorbate

| Component | Concentration |
|---|---|
| sodium bisulfite | 0.5 wt % |
| MOPS | 2 wt % |
| PROXEL ® GXL | 0.1 wt % |

*The pH of the inkjet ink in Table 2 was adjusted to be about 6.75

TABLE 3

An example of an erasable inkjet ink containing iron ascorbate in combination with a dye

| Component | Concentration |
|---|---|
| iron ascorbate | 3 wt % |
| 1,2-propanediol | 5 wt % |
| Glycerol | 5 wt % |
| sodium bisulfite | 0.5 wt % |
| MOPS | 2 wt % |
| ACRC Natural Blue 2179 | 4 wt % |
| ACRC Natural Red 2180 | 2 wt % |
| FDC Yellow 5 | 3 wt % |

*The pH of the inkjet ink in Table 3 was adjusted to be about 6.75

TABLE 4

Another example of an erasable inkjet ink containing iron ascorbate in combination with a dye

| Component | Concentration |
|---|---|
| iron ascorbate | 2 wt % |
| 1,2-propanediol | 20 wt % |
| Glycerol | 10 wt % |
| sodium bisulfite | 0.25 wt % |
| PIPES | 2 wt % |
| ACRC Natural Blue 2179 | 3 wt % |
| ColorMaker ® Natural Magenta (carminic acid) | 3 wt % |
| ColorMaker ® Natural Yellow (saffron) | 7 wt % |

*The pH of the inkjet ink in Table 4 was adjusted to be about 6.75

TABLE 5

An example of an erasable inkjet ink containing a colorant based on iron in combination with caffeic acid

| Component | Concentration |
|---|---|
| caffeic acid | 2.5 wt % |
| 1,2-propanediol | 10 wt % |
| Glycerol | 5 wt % |
| ferrous chloride (2 mol Cl:1 mol Fe(II)) | 1 wt % |
| MOPS | 0.5 wt % |
| PROXEL ® GXL | 0.1 wt % |

*The pH of the inkjet ink in Table 5 was adjusted to be about 6.75

TABLE 6

An example of an erasable inkjet ink containing a dye-blend mono-based colorant

| Component | Concentration |
|---|---|
| Natural Blue 2179 | 3 wt % |
| ColorMaker ® Natural Magenta (carminic acid) | 3 wt % |
| ColorMaker ® Natural Yellow (saffron) | 8 wt % |
| 1,2-propanediol | 20 wt % |
| Glycerol | 10 wt % |
| MOPS | 0.25 wt % |

*The pH of the inkjet ink in Table 6 was adjusted to be about 6.75

An example of an ink set formed from examples of the erasable inkjet ink containing dye-blend mono-based colorants is shown in Tables 7 through 9 below. Again, water makes up the balance of each of the formulations set forth below.

TABLE 7

An example of a magenta erasable inkjet ink for the ink set

| Component | Concentration |
|---|---|
| ColorMaker ® Natural Magenta (carminic acid) | 3 wt % |
| 1,2-propanediol | 20 wt % |
| Glycerol | 10 wt % |
| MOPS | 1 wt % |

*The pH of the inkjet ink in Table 7 was adjusted to be about 7

TABLE 8

An example of a cyan erasable inkjet ink for the ink set

| Component | Concentration |
|---|---|
| ACRC Natural Blue 2179 | 4 wt % |
| 1,2-propanediol | 20 wt % |
| Glycerol | 10 wt % |
| MOPS | 1 wt % |

*The pH of the inkjet ink in Table 8 was adjusted to be about 7.5

TABLE 9

An example of a yellow erasable inkjet ink for the ink set

| Component | Concentration |
|---|---|
| ColorMaker ® Natural Yellow (saffron) | 8 wt % |
| 1,2-propanediol | 20 wt % |
| Glycerol | 10 wt % |
| Citric acid | 0.2 wt % |

*The pH of the inkjet ink in Table 9 was adjusted to be about 7

As previously mentioned, the erasure fluid is specifically selected to interact with a particular colorant of the erasable inkjet ink. It is believed that the interaction of an erasure component of the erasure fluid and the colorant causes the inkjet ink (and thus the image) established on the medium (and thus in its solid and dry form) to disappear. More specifically, when the erasure fluid is applied to the inkjet ink (i.e., the image) on the medium during an erasing process, the colorant of the ink (in examples where the colorant itself acts as a catalyst) triggers a chemical reaction between the colorant and the erasure component of the erasure fluid. It may otherwise be useful to include a separate catalyst in the ink formulation, particularly in instances where the colorant does not suitably act as a catalyst itself. Some examples of catalysts that may be included in the ink include ferrous ions, copper ions, manganese ions, or other metal ions that may suitably catalyze the reaction.

The chemical reaction between the colorant and the erasure component of the erasure fluid causes the colorant to degrade, and when this occurs, the ink substantially completely disappears from the surface of the medium. At this time, the image is considered to be erased. As used herein, an ink "substantially completely disappears" from the medium when there is little or no image on the medium that is readily noticeable or otherwise decipherable by the human eye. For instance, an ink substantially completely disappears (as defined herein) from the medium when about 80% to about 100% of the ink disappears from the medium. This may be accomplished, e.g., by measuring the residual color left on the medium after erasing, such as by measuring its optical density or its color space coordinate L* using, e.g., a densitometer such as a SPECTROLINE™ (Gretag-MacBeth GmbH (Switzerland). It is to be understood, however, that the amount (e.g., percentage) of the ink remaining after erasing depends, at least in part, on the amount of the erasure fluid applied, the chemistry of the ink, or combinations thereof. Details of the chemical reaction that occurs between the colorant and the erasure component of the erasure fluid during erasing may be found in PCT International Application Serial No. PCT/US11/39025 filed concurrently herewith, which is incorporated by reference herein in its entirety.

Some specific combinations of erasable inks and erasure fluids specifically formulated to erase the ink are set forth in Table 10 below. More specifically, Table 10 provides the erasure component present in the erasure fluid that may suitably degrade the colorant of the erasable ink. As previously mentioned, a complete description of the examples of the erasure fluid (such as those provided in Table 9 below) is found in PCT International Application Serial No. PCT/US11/39014 filed concurrently herewith.

TABLE 10

Example combinations of erasable inkjet inks and erasure fluids

| Colorant of the erasable inkjet ink | Erasure component of the erasure fluid |
|---|---|
| carminic acid | Peroxymonosulfate |
| an anthocyanin dye | hydrogen peroxide |
| iron-based ionic complex | Hydrogen peroxide in combination with a chelating agent such as citric acid |
| saffron | Peroxymonosulfate |

An example of a method of making the erasable inkjet ink will now be disclosed herein. The method generally involves forming a vehicle by combining selected components of the ink vehicle, and then adding a colorant to the vehicle. In one particular example, as shown in FIG. 1, the method involves combining at least 1,2-propanediol and glycerol (see reference numeral 100 in FIG. 1), and adding the colorant to the vehicle (see reference numeral 102). To reiterate from above, the colorant may be chosen from an iron-based ionic complex, an iron-based ionic complex in combination with a dye, a non-ascorbic acid based complex, and a dye-blend mono-based colorant. It is to be understood that the colorant is selected from one of these colorants based, at least in part, on the erasure fluid to be applied to the ink to erase the ink, and thus the image formed on the surface of the medium. In an example, the method may further include adjusting the pH of the ink (see reference numeral 104). This may be accomplished, e.g., by adding a pH buffer to the ink.

It is to be understood that, in some instances, other components may also be added to the vehicle before adding the colorant. For example, sodium bisulfite or a combination of sodium bisulfite and sorbitol (in desirable respective concentrations) may be added to the ink vehicle prior to adding the colorant in order to deoxygenate the ink vehicle (as previously described).

Further, it is to be understood that the examples of the erasable inkjet ink disclosed herein are printable via an inkjet printing system, such as, e.g., a thermal inkjet printhead. It is also contemplated herein that the erasable inkjet ink is also printable from a piezoelectric inkjet printhead. When printed, the inkjet ink forms an image on the medium, and this image may be erased when the erasure fluid is applied to the image. Details for how the erasure fluid may be applied to the ink to erase the ink from the medium are also provided in PCT International Application Serial No. PCT/US11/39014.

To further illustrate the present disclosure, examples are given herein. It is to be understood that these examples are provided for illustrative purposes and are not to be construed as limiting the scope of the disclosure. It is to be understood that the recitation of weight percents (wt %) herein is with respect to the total weight of the formulation (e.g., the erasable inkjet ink).

EXAMPLES

Example 1

Four ink samples (i.e., Inks 1-4) were prepared, and the inks were printed on HP Recycled Office paper (available from Hewlett-Packard Co., Houston, Tex.) using a thermal inkjet printer similar to the HP Office Jet Pro 8000 printer (also available from Hewlett-Packard Co.). The formulations of the ink samples are provided in Table 11 below:

TABLE 11

Formulations of Inks 1-4

| | Ink 1 (wt %) | Ink 2 (wt %) | Ink 3 (wt %) | Ink 4 (wt %) |
|---|---|---|---|---|
| Iron ascorbate | 4 | 4 | 4 | 4 |
| 1,2-propanediol | 20 | 20 | 20 | 20 |
| Glycerol | 10 | 10 | 10 | 10 |
| MOPS | 0.2 | 2 | 2 | 2 |
| Sodium bisulfite | 0 | 0.5 | 0.5 | 1 |
| Sorbitol | 0 | 0 | 5 | 0 |
| Sodium ascorbate | 0 | 0 | 0 | 1 |
| pH | 6.75 | 6.75 | 7 | 7 |

Figure 2A:
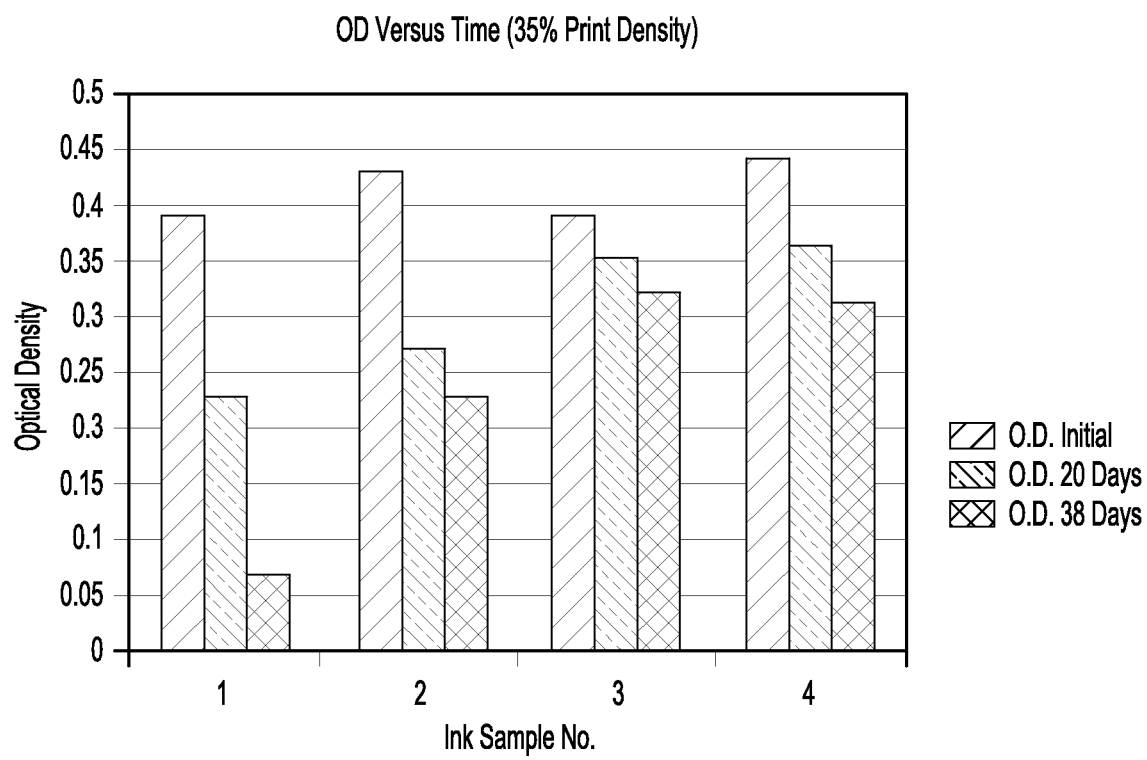
FIGS. 2A and 2B are graphs showing the effect of optical density over a period of time for four different samples produced using examples of the erasable inkjet ink disclosed herein.
Figure 2B:
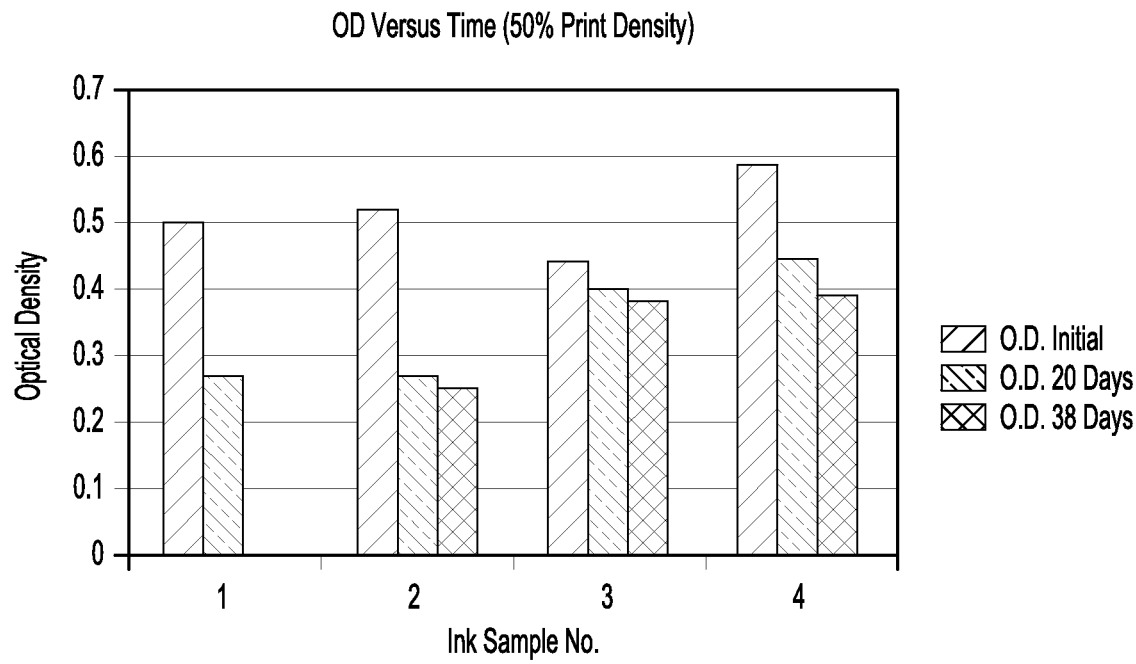

The optical density of the images produced by the inks printed at 35% and 50% print density was evaluated at the time of printing, 20 days after printing, and 38 days after printing. The results of this evaluation are shown in FIG. 2A for the case where the inks were printed at 35% print density, and FIG. 2B for the case where the inks were printed at 50% print density. Generally, a change in optical density of greater than about 0.03 optical density units is considered to be a large change over the time period tested (i.e., from the time of printing through 38 days after printing), and the samples exhibiting an optical density change less than 0.03 were desirable. As shown in FIGS. 2A and 2B, a change of less than 0.03 optical density units occurred for the samples produced using Ink 3 (which included 0.5 wt % sodium bisulfite and 5 wt % sorbitol) and Ink 4 (which included 1 wt % of sodium bisulfite and no sorbitol) over the time period tested, which was smaller than the optical density change for the samples produced using Inks 1 and 2 over the same time period.

Figure 3A:
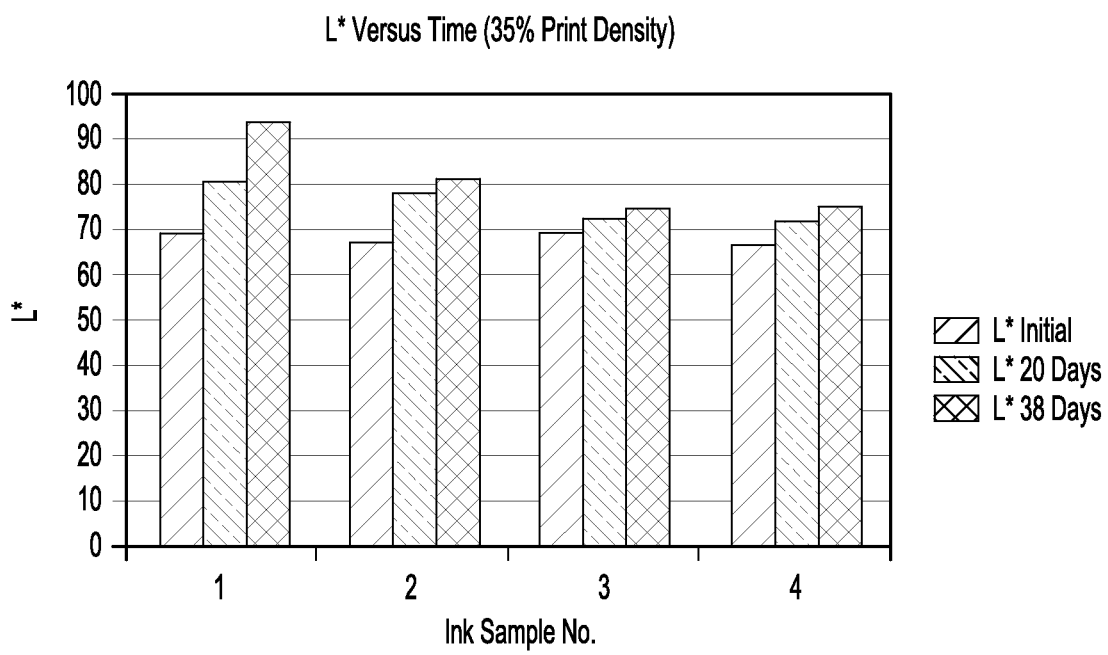
FIGS. 3A and 3B are graphs showing the effect of the color space coordinate L* over a period of time for the same ink samples used to generate the graphs for FIGS. 2A and 2B.
Figure 3B:
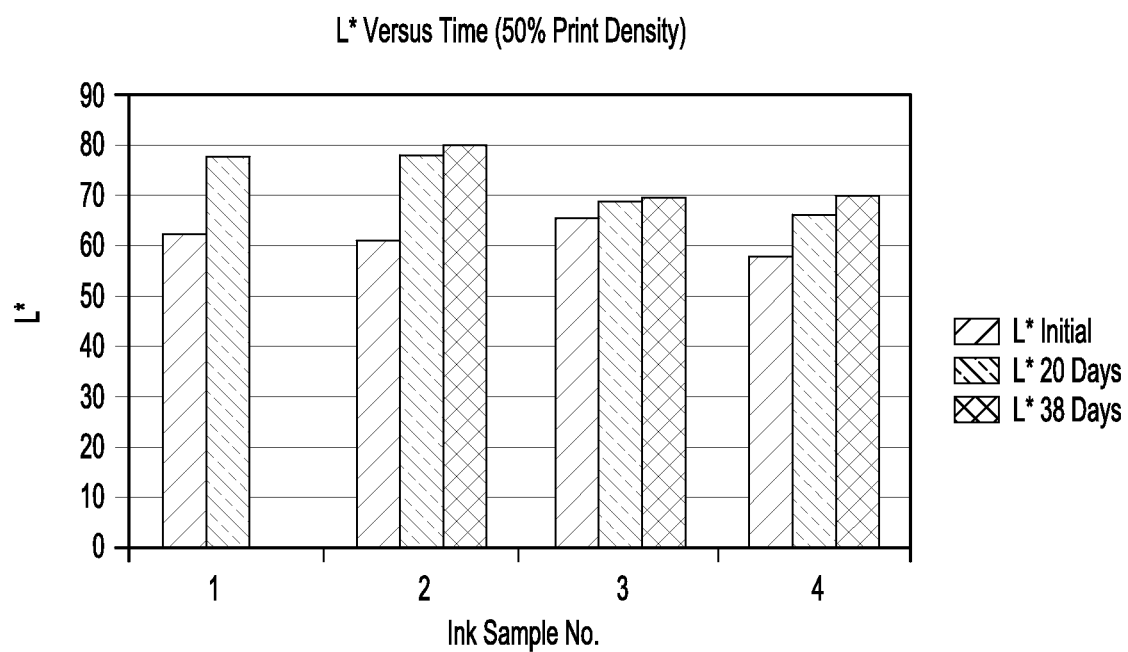

The optical density in terms of the color space coordinate L* of the images produced by the inks printed at 35% and 50% print density was also evaluated at the time of printing, 20 days after printing, and 38 days after printing. The results of this evaluation are shown in FIG. 3A for the case where the inks were printed at 35% print density, and FIG. 3B for the case where the inks were printed at 50% print density. Generally, as the L* increases, the image fades or becomes lighter in appearance. Further, a change in L* of less than about 5 is considered to be a small change over the time period tested (i.e., from the time of printing through 38 days after printing), and the samples exhibiting an L* change less than about 5 is desirable, whereas a change of greater than about 5 is considered to be undesirable. As shown in FIGS. 3A and 3B, a change of L* of less than about 5 occurred for the samples produced using Inks 3 and 4 over the time period tested, which was smaller than the L* for the samples produced using Inks 1 and 2 over the same time period. As such, Inks 3 and 4 appeared to perform better than did Inks 1 and 2, and Ink 3 appeared to perform the best overall in this set of tests.

It is believed that the presence of the sodium bisulfite in the amount used in Ink 4 or the combination of the bisulfite and sorbitol in the respective amounts used in Ink 3 can react with, and deplete oxygen present during the erasing. In some instances, the sodium bisulfite or the combination of sodium bisulfite and sorbitol may reverse oxidation if such occurred during erasing.

It is noted that Ink Sample No. 1 in FIGS. 2B and 3B does not have an optical density value or L* value at 38 days, as the ink would no longer print well at 38 days.

Example 2

Figure 5:
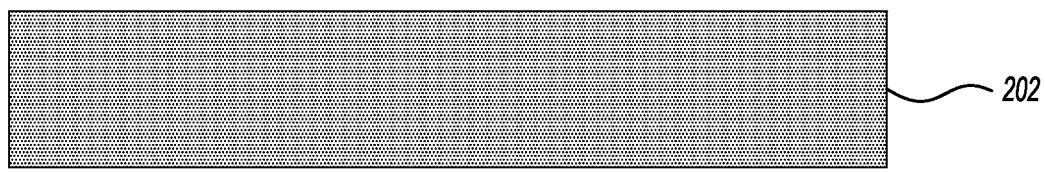
Figure 6:
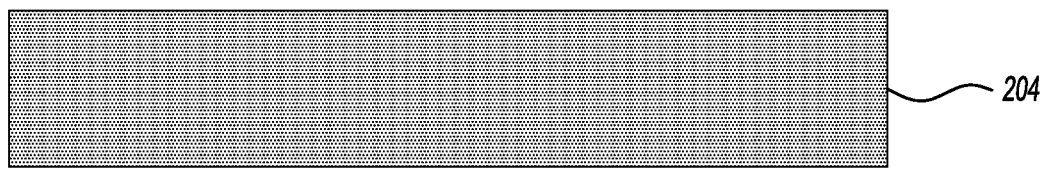

Several inks were prepared, and printed on HP Recycled Office paper (available from Hewlett-Packard, Co., Houston, Tex.) using a thermal inkjet printer similar to the HP Office Jet Pro 8000 printer (also available from Hewlett-Packard, Co.). The formulation of Inks 5-11 are provided in Table 12 below. Further, representations of the images produced when Inks 5, 10, and 11 were printed are shown in FIGS. 4, 5, and 6, respectively, and are identified by reference numerals 200, 202, and 204, respectively. A representation of the images produced when Inks 6-9 were printed is shown in FIG. 8, and the images are identified by reference numerals 206, 208, 210, and 212 for Inks 6, 7, 8, and 9, respectively. As shown in FIGS. 4-6 and 8, the erasable inks, when printed, suitably produced images on paper.

TABLE 12

| Formulations of Inks 5-11 | |
| --- | --- |
| Ink Colorant | Vehicle |
| 5 Iron ascorbate | 20 wt % 1,2-propanediol; 20 wt % glycerol; 0.25 wt % sodium bisulfite; 2 wt % MOPS; 0.1 wt % PROXEL ® GXL; pH = 6.75 |
| 6 Saffron (8 wt % ColorMaker ® Natural Yellow) | 20 wt % 1,2 propanediol; 10 wt % glycerol; 0.2 wt % citric acid pH = 6 |
| 7 Cochineal (3 wt % Natural Red 2180) | 20 wt % 1,2-propanediol; 10 wt % glycerol; 1 wt % MOPS pH = 7 |
| 8 Anthocyanin from red cabbage (4 wt % Natural Blue 2179) | 20 wt % 1,2-propanediol; 10 wt % glycerol; 1 wt % MOPS; pH = 7.5 |
| 9 Dye-blend including saffron, cochineal, and anthocyanin from red cabbage (4 wt % Natural Blue 2170) (3 wt % ColorMaker ® Natural Magenta) (8 wt % ColorMaker ® Natural Yellow) | 10 wt % 1,2-propanediol; 5 wt % glycerol; 0.5 wt % MOPS; pH = 7 |
| 10 Iron gallic acid complex (taken from the supernatant of a mixture of iron sulfate and gallic acid at a pH of 2) | 20 wt % 1,2-propanediol; 10 wt % glycerol; 0.6 wt % TERGITOL ® TMN6; 0.2 wt % PROXEL ® GXL; 0.14 wt % KORDEX ®; pH = 2 |

TABLE 12-continued

| Formulations of Inks 5-11 | |
| --- | --- |
| Ink Colorant | Vehicle |
| 11 Iron caffeic acid complex (2.5 wt % caffeic acid and FeCl$_2$ added to make 2 moles acid per 1 mole iron) | 10 wt % 1,2-propanediol; 5 wt % glycerol; 0.5 wt % MOPS; 0.1 wt % PROXEL ® GXL; pH = 6.75 |

For Ink 10 in Table 12 above, the iron gallic acid complex was prepared by dissolving about 40 g of Fe(SO$_4$).7H$_2$O in about 110 g of water, and then slowly adding to the solution, about 25 g of gallic acid dissolved in about 110 g of methanol. The mixture turned very dark (black), and after 1 hour, it was filtered to remove a precipitant. The filtrate was collected and stored in a bottle. More material precipitated, and it was filtered again, saving the black filtrate. This black filtrate was used as the iron gallic acid complex, and the other vehicle components were added to the filtrate (in appropriate amounts) to make up the rest of the ink. The resulting ink was about 70 wt % filtrate colorant and about 30 wt % vehicle.

Example 3

Figure 7:
FIGS. 7 and 9 are representations of examples of the medium after effectively erasing examples of the erasable inkjet ink from the medium.

The image 200 produced by Ink 5 shown in FIG. 4 was erased by applying an erasure fluid containing a hydrogen peroxide erasure component, and the result of the erasing is shown in FIG. 7. The erased image is represented in FIG. 7 by reference numeral 200'. Application of the erasure fluid was accomplished by manually roll coating the fluid onto the medium using an 8 inch wide brayer. It was found that the image (formed by the ink) was effectively erased from the paper.

Example 4

Figure 9:
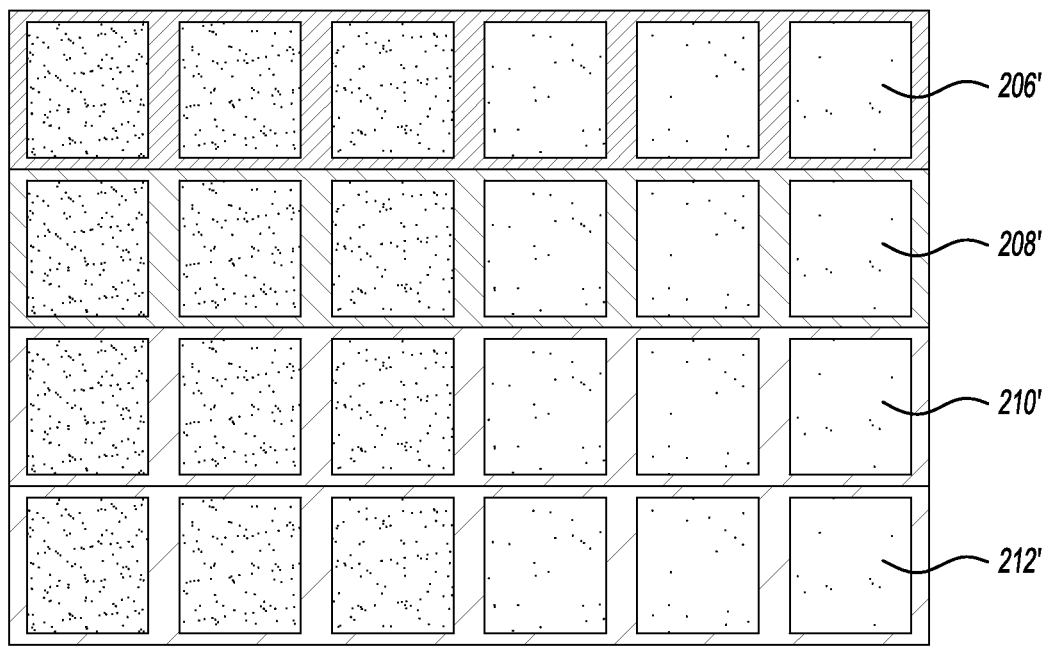

Portions of the images 206, 208, 210, and 212 produced by Inks 6, 7, 8, and 9, respectively (shown in FIG. 8) were erased by applying an erasure fluid containing a sodium persulfate erasure component. The erased portions 206', 208', 210', and 212' are shown in FIG. 9. In this example, the erasure fluid was applied by jetting the fluid from an inkjet printhead, and then overprinting the pattern which is shown as substantially white blocks in FIG. 9 (i.e., the erased portions of the images 206', 208', 210', and 212') about 24 hours after the erasure fluid was applied to the paper. It was again found that the portion of the images (formed by the respective inks) was effectively erased from the paper.

It is to be understood that concentrations, amounts, and other numerical data have been presented herein in range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 2 wt % to about 6 wt % should be interpreted to include not only the explicitly recited concentration limits of about 2 wt % to about 6 wt %, but also to include individual concentrations such as 3 wt %, 4 wt %, 5.5 wt %, etc., and sub-ranges such as 3 wt % to 5 wt %, 3.75 wt % to 4.25 wt %, etc. Furthermore, when "about" is utilized to describe a value, this is meant to encompass minor variations (up to +/−5%) from the stated value.

It is further to be understood that, as used herein, the singular forms of the articles "a," "an," and "the" include plural references unless the content clearly indicates otherwise.

Additionally, the term "any of", when used in conjunction with lists of components (e.g., the deoxygenation agent) refers to one of the components included in the list alone or combinations of two or more components. For instance, the term "any of", when used with reference to the deoxygenation agent, includes i) sodium bisulfite alone, ii) sorbitol alone, iii) or combinations of the two.

While several examples have been described in detail, it will be apparent to those skilled in the art that the disclosed examples may be modified. Therefore, the foregoing description is not to be considered limiting.

What is claimed is:

1. An erasable inkjet ink composition, comprising:
   an ink vehicle including a solvent; and
   a colorant added to the ink vehicle, the colorant being chosen from an iron-based ionic complex, an iron-based ionic complex in combination with a dye, and a non-ascorbic acid based complex;
   wherein the erasable ink composition is removable from a medium by degradation of the colorant in response to a chemical reaction between the colorant of the erasable ink composition and an erasure fluid.

2. The erasable ink composition as defined in claim 1 wherein the solvent is a co-solvent chosen from 1,2-propanediol, glycerol, and combinations thereof.

3. The erasable ink composition as defined in claim 1 wherein the colorant is the iron-based ionic complex, and the iron-based ionic complex is iron ascorbate, and wherein the iron ascorbate is present in an amount ranging from about 1 wt % to about 6 wt % of the erasable ink composition.

4. The erasable ink composition as defined in claim 1 wherein: the colorant is chosen from the iron-based ionic complex in combination with the dye; the iron-based ionic complex is chosen from iron ascorbate; and the dye is chosen from anthocyanins, saffron, turmeric, cochineal, indigo carmine, acid blue 9, FDC yellow 5, FDC red 40, and food black 2.

5. An erasable inkjet ink composition, comprising:
   an ink vehicle including a solvent; and
   a colorant added to the ink vehicle, wherein the colorant is a non-ascorbic acid based complex formed from a combination of metal ions and one of i) a polyphenol or ii) caffeine.

6. The erasable ink composition as defined in claim 1, further comprising any of i) sodium bisulfite present in an amount that is less than about 1 wt % of the erasable ink composition, or ii) or sorbitol present in an amount that is less than about 6 wt % of the erasable ink composition.

7. The erasable ink composition as defined in claim 1 wherein: the pH of the erasable ink composition ranges from about 5 to about 7.5 when the colorant is the iron-based ionic complex; the pH of the erasable ink composition ranges from about 6 to about 7.5 when the colorant is the iron-based ionic complex in combination with a dye; and the pH of the erasable ink composition ranges from about 6.5 to about 7.5 when the colorant is the non-ascorbic acid-based colorant.

8. The erasable ink composition as defined in claim 1 wherein the erasable ink composition is an inkjet ink composition printable on the medium via a thermal inkjet pen.

9. A method of making an erasable ink composition, comprising:
   forming an ink vehicle by combining at least 1,2-propanediol and glycerol;
   adding a colorant to the ink vehicle, the colorant being chosen from an iron-based ionic complex, an iron-based ionic complex in combination with a dye, and a non-ascorbic acid based complex; and
   adjusting the pH of the erasable ink composition;
   wherein the erasable ink composition is removable from a medium by degradation of the colorant in response to a chemical reaction between the colorant of the erasable ink composition and an erasure fluid.

10. The method as defined in claim 9 wherein prior to adding the colorant, the method further comprises deoxygenating the ink vehicle by adding any of i) less than about 1 wt % of sodium bisulfite to the ink vehicle, or ii) less than about 6 wt % of sorbitol to the ink vehicle.

11. A method of making an erasable ink composition, comprising:
   forming an ink vehicle by combining at least 1,2-propanediol and glycerol;
   adding a colorant to the ink vehicle, the colorant being chosen from an iron-based ionic complex, an iron-based ionic complex in combination with a dye, a non-ascorbic acid based complex, and a dye-blend mono-based colorant; and
   adjusting the pH of the erasable ink composition by adding a pH buffer to the ink vehicle, the pH buffer being chosen from 3-(N-morpholino)propanesulfonic acid (MOPS), 3-morpholino-2-hydroxy-propanesulfonic acid (MOPSO), 1,4-piperazinediethanesulfonic acid (PIPES), tris(hydroxymethyl)aminomethane (TRIS), and combinations thereof.

12. An erasable inkjet ink composition, comprising:
   an ink vehicle, including:
   1,2-propanediol present in an amount ranging from about 5 wt % to about 20 wt % of the ink composition; and
   glycerol present in an amount ranging from about 5 wt % to about 20 wt % of the ink composition; and
   a colorant added to the ink vehicle, the colorant being chosen from an ionic complex and an ionic complex in combination with a dye, the colorant being present in an amount ranging from about 2 wt % to about 14 wt %;
   wherein the ink composition is printable from a thermal inkjet printhead;
   and wherein the erasable ink composition is removable from a medium by degradation of the colorant in response to a chemical reaction between the colorant of the erasable ink composition and an erasure fluid.

13. The erasable ink composition as defined in claim 12 wherein the ionic complex is formed from metal ions in combination with one of ascorbic acid, caffeic acid, chlorogenic acid, gallic acid, hydroxytyrosol, protocatechuic acid, or caffeine.

14. The erasable ink composition as defined in claim 13 wherein the metal ions are chosen from ions of: iron; copper; manganese; cobalt; zinc; titanium; and tin.

15. The erasable ink composition as defined in claim 1 wherein the colorant is the iron-based ionic complex, and wherein the iron-based ionic complex is formed from an iron metal ion in combination with one of ascorbic acid, caffeic acid, chlorogenic acid, gallic acid, hydroxytyrosol, protocatechuic acid, or caffeine.

* * * * *